(12) United States Patent
Krois et al.

(10) Patent No.: US 9,245,055 B2
(45) Date of Patent: Jan. 26, 2016

(54) VISUALIZATION-BASED USER INTERFACE SYSTEM FOR EXPLORATORY SEARCH AND MEDIA DISCOVERY

(76) Inventors: Christian Krois, Munich (DE); Klaus Gasteier, Berlin (DE)

(*) Notice: Subject to any disclaimer, the term of this patent is extended or adjusted under 35 U.S.C. 154(b) by 1096 days.

(21) Appl. No.: 12/998,404

(22) PCT Filed: Oct. 16, 2009

(86) PCT No.: PCT/DE2009/001440
§ 371 (c)(1),
(2), (4) Date: May 19, 2011

(87) PCT Pub. No.: WO2010/043211
PCT Pub. Date: Apr. 22, 2010

(65) Prior Publication Data
US 2012/0017145 A1  Jan. 19, 2012

Related U.S. Application Data

(60) Provisional application No. 61/215,730, filed on May 8, 2009.

(30) Foreign Application Priority Data

Oct. 16, 2008 (DE) .......................... 10 2008 051 880

(51) Int. Cl.
*G06F 17/30* (2006.01)
(52) U.S. Cl.
CPC ................................ *G06F 17/30991* (2013.01)
(58) Field of Classification Search
CPC .................................................. G06F 17/30991
USPC .......................................... 715/200, 205, 246
See application file for complete search history.

(56) References Cited

U.S. PATENT DOCUMENTS

| | | | |
|---|---|---|---|
| 6,311,194 B1* | 10/2001 | Sheth et al. .................... | 715/236 |
| 7,490,313 B2* | 2/2009 | Sinclair et al. ................ | 717/100 |
| 8,117,280 B2* | 2/2012 | Masuouka et al. ............ | 709/218 |
| 8,522,151 B2 | 8/2013 | Robertson et al. | |
| 2002/0103869 A1* | 8/2002 | Goatly et al. .................. | 709/206 |
| 2002/0107827 A1* | 8/2002 | Benitez-Jimenez et al. ..... | 706/59 |
| 2002/0194220 A1* | 12/2002 | Sluiman ........................ | 707/513 |
| 2002/0198909 A1* | 12/2002 | Huynh et al. .................. | 707/513 |
| 2003/0050927 A1* | 3/2003 | Hussam ............................ | 707/5 |
| 2003/0123850 A1* | 7/2003 | Jun et al. .......................... | 386/68 |
| 2004/0015783 A1* | 1/2004 | Lennon et al. ................. | 715/523 |

(Continued)

OTHER PUBLICATIONS

International Search Report.

(Continued)

*Primary Examiner* — Stephen Hong
*Assistant Examiner* — Marshon Robinson
(74) *Attorney, Agent, or Firm* — Collard & Roe, P.C.

(57) ABSTRACT

A user interface system for exploratory search and media discovery includes a display unit with a specific geometrical grid for the visualization of multidimensional interrelations among media items and includes a processing unit programmed to distribute and map media items to the grid coordinates. A method includes user interaction with the user interface system for exploratory browsing, with the users interacting with the visualization grid based on an extension of the focus-plus-context principle for a fluent browsing process. A further method includes generating the specific grid on the display unit.

34 Claims, 18 Drawing Sheets

(56) References Cited

U.S. PATENT DOCUMENTS

Figure 1:
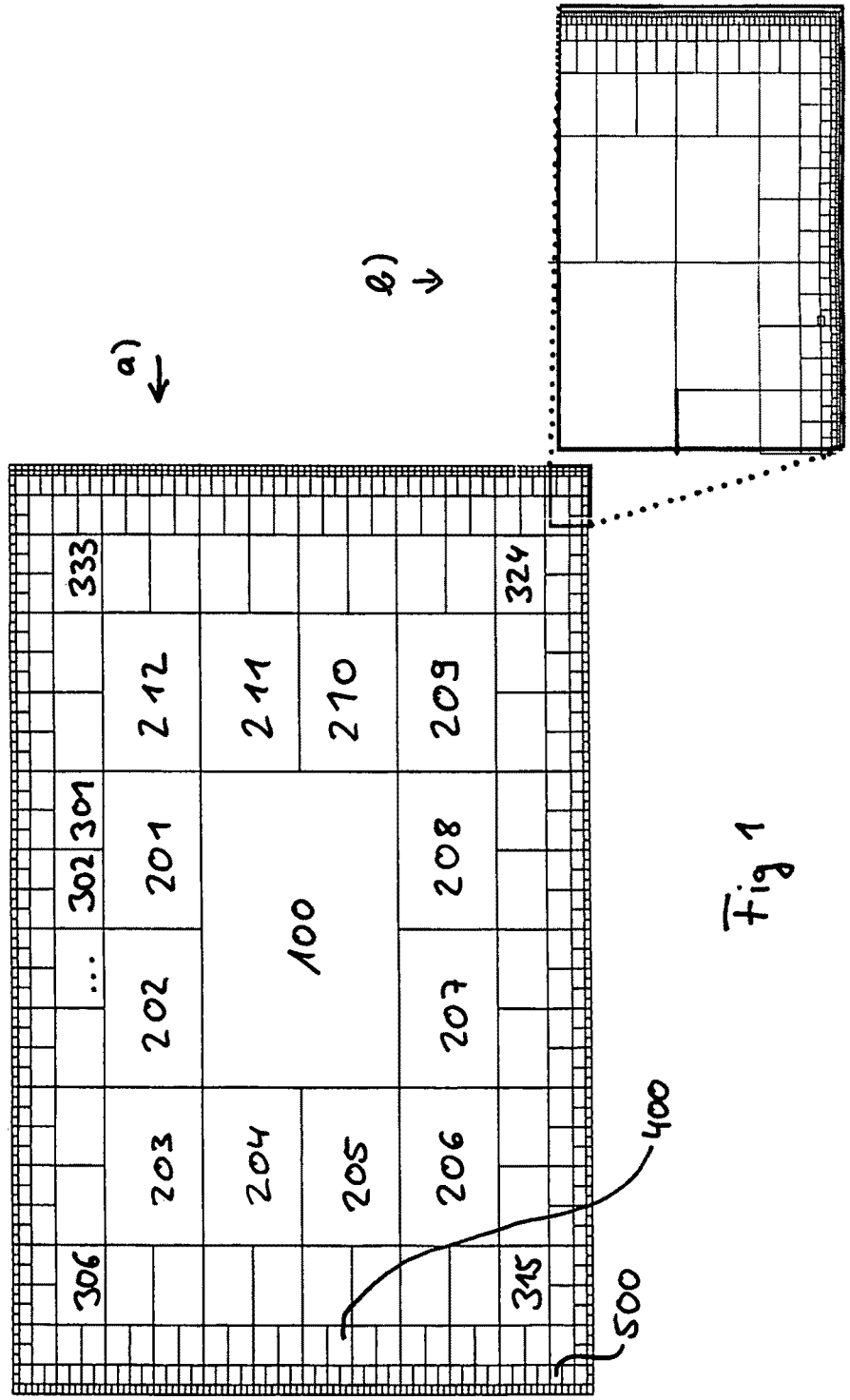

| | | | |
|---|---|---|---|
| 2004/0070612 A1* | 4/2004 | Sinclair et al. | 345/762 |
| 2005/0060647 A1* | 3/2005 | Doan et al. | 715/514 |
| 2005/0108217 A1* | 5/2005 | Werner et al. | 707/3 |
| 2005/0114802 A1* | 5/2005 | Beringer et al. | 715/968 |
| 2005/0192926 A1* | 9/2005 | Liu et al. | 707/1 |
| 2005/0193222 A1* | 9/2005 | Greene | 713/201 |
| 2007/0011042 A1* | 1/2007 | Kim | 705/10 |
| 2007/0033198 A1* | 2/2007 | Defries | 707/10 |
| 2007/0033531 A1* | 2/2007 | Marsh | 715/738 |
| 2007/0033590 A1* | 2/2007 | Masuouka et al. | 718/100 |
| 2008/0027895 A1* | 1/2008 | Combaz | 707/1 |
| 2009/0164387 A1* | 6/2009 | Armstrong et al. | 705/36 R |
| 2010/0042944 A1* | 2/2010 | Robinson et al. | 715/771 |

OTHER PUBLICATIONS

Amato, A. et al., "An Interface for Semantic Browsing of an Images Database," Virtual Environments, Human-Computer Interfaces and Measurement Systems, 2004 (VCIMS), IEEE Symposium on Boston, MA, Jul. 2004, pp. 67-71. XP010773301 (ISR).

Ontrup, J. et al., "Large-scale data exploration with the hierarchically growing hyperbolic Som," Neural Networks, Elsevier Science Publishers, Barking, GB, vol. 19, Nos. 6-7, Jul. 2006, pp. 751-761. XP024902834 (ISR).

Glossary of iPod Library Access Programming Guide; downloaded from https://developer.apple.com/library/iOS/documentation/Audio/Conceptual/iPodLibraryAccess_Guide/Glossary/Glossary.html; updated on Feb. 21, 2011.

Helwig Hauser, Generalizing Focus+Context Visualization, professional dissertation, 2003-2004, Technischen Universitaet, Vienna, Austria, downloaded from http://www.ii.uib.no/vis/team/hauser/_pdfs/2003-12-26--HabilHelwigHauser.pdf.

Cockburn, Karlson, Bederson, A Review of Focus and Context Interfaces, 2006, downloaded from http://hcil2.cs.umd.edu/trs/2006-09/2006-09.pdf.

Lamping, Rao, Pirolli, A Focus+Context Technique Based on Hyperbolic Geometry for Visualizing Large Hierarchies, 1995 Conference on Human Factors in Computing Systems, Denver 1995, downloaded from http://www.sigehi.org/chi95/Electronic/documnts/papers/jl_bdy.htm.

Wikipedia article—"Exploratory search", downloaded on Jun. 6, 2014 from http://en.wikipedia.org/wiki/Exploratory_search.

Tim Berners-Lee, Cleaning up the User Interface, 1997, downloaded from http://www.w3.org/DesignIssues/UI.html.

Tobiasz, Isenberg, Carpendale, "Lark", downloaded from http://petra.isenberg.cc/wiki/pmwiki.php?n=MyUniversity.Lark on Jun. 6, 2014.

Tobiasz, Isenberg, Carpendale, "Lark: Coordinating Co-located Collaboration with Information Visualization", Oct. 11, 2009, downloaded from http://petra.isenberg.cc/publications/papers/Tobiasz_2009_LCC.pdf.

Schattschneider, Doris, The Mathematical Side of M.C. Escher, Notices of the American Mathematical Society, vol. 57, No. 6, Jun./Jul. 2010, pp. 706-718.

* cited by examiner

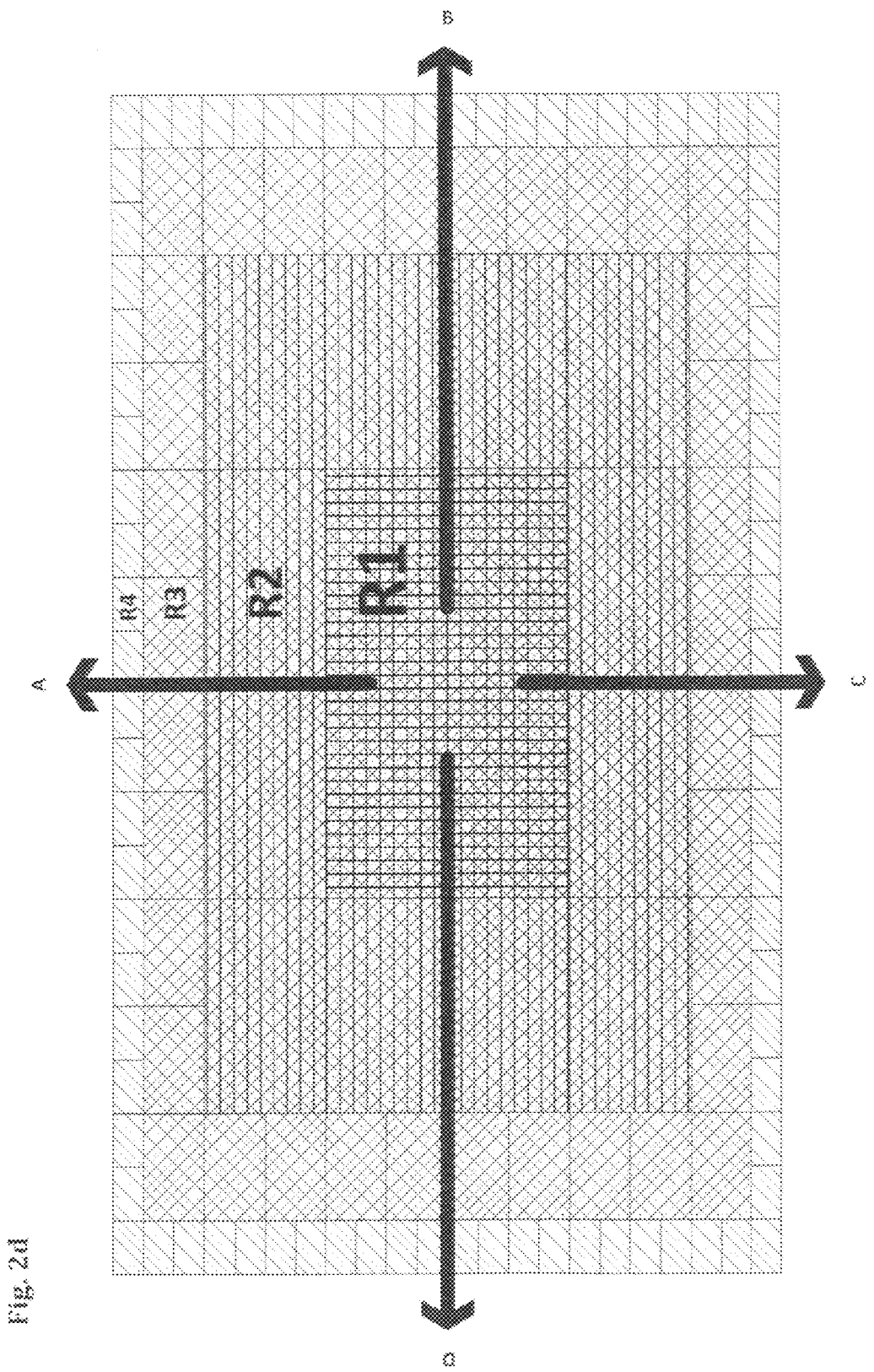

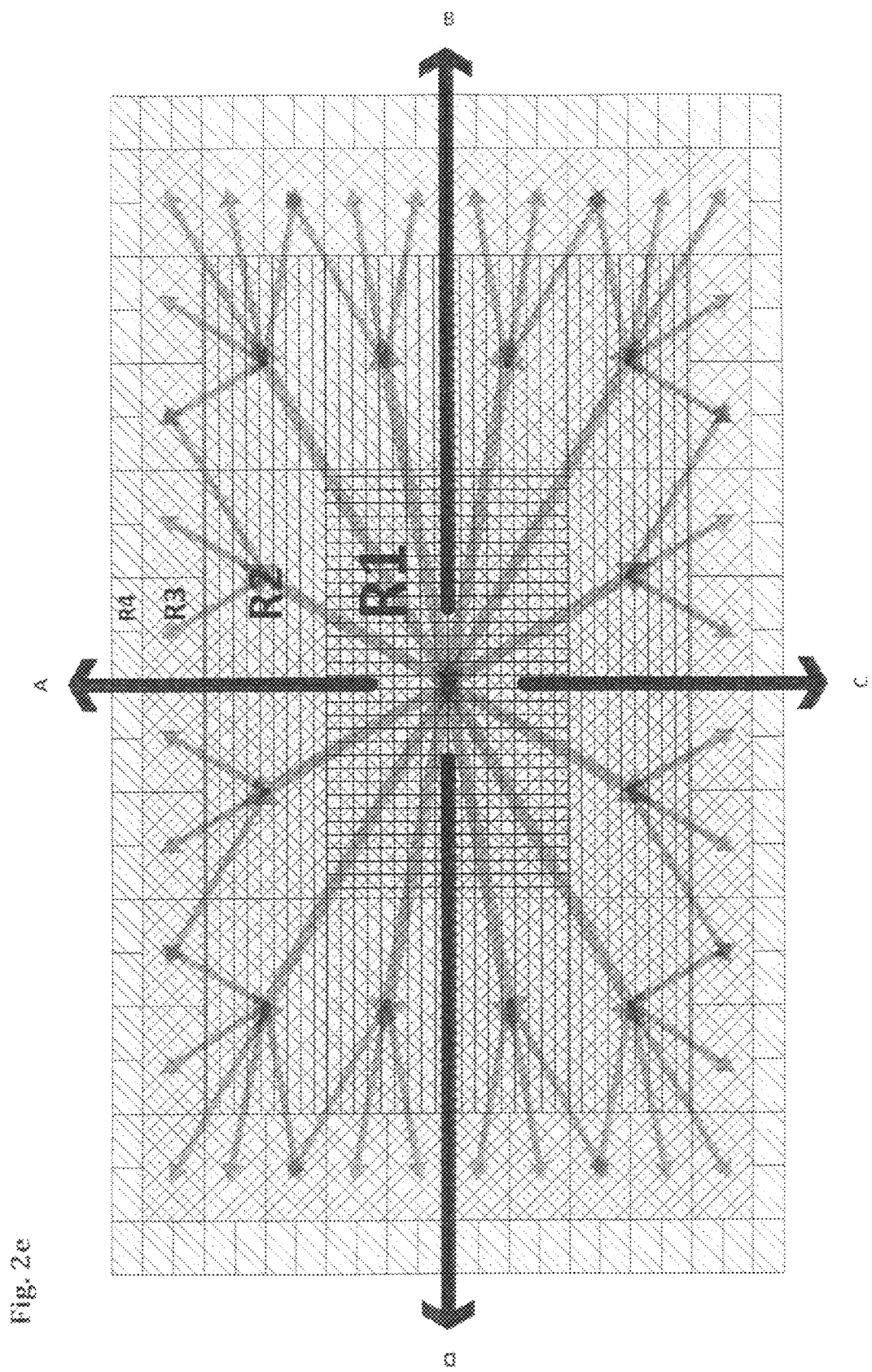

Fig. 5a

Fig. 5c

| Switzer-land | Menno-nites | | Dalai Lama: World peace 301 | | | Kofi Annan: War and Peace today | Naval battles | | Lord Nelson | Napoleon |
|---|---|---|---|---|---|---|---|---|---|---|
| Refor-mation | Amish | | Pacifism 302 | | | | | | Trafalgar | Spanish Armada |
| Dove 304 | | Jesus Christ 390 | Mahatma Ghandi 303 | Water 202 | Oceanography 201 | Geopolitics | Sir Halford John Mackinder | | Oxford 325 | |
| Gulf stream 305 | | Atlantischer Ozean | | | | Indian Ocean 208 | | | Arctic Ocean 324 | |
| Mediterranean 306 | | | | | Pacific Ocean 100 | | | | North Pole 323 | |
| Sir Francis Drake 307 | | Lalita Ramdas: Follow the whale! | | | | The seven seas 207 | | | The Piri Reis mystery 322 | |
| Christopher Columbus 308 | | | | | | | | | Tor Heyerdal: Kon-Tiki 321 | |
| Scorpions 309 | The Gobi Desert 310 | | Desert 311 | Bermuda Triangle 205 | The South Seas 206 | "South Sea Bubble" 318 | British Empire 319 | | City of London 320 | |
| California | the "desert rock" scene | Sahara 392 | Cactus 312 | | | Stock markets | Money | | Pink Floyd | Pink |
| Kyuss | The 90's | | | | | | | | 7th July Syd Barrett | Berlin Wall |

496

| Karl Marx | Machiavelli | Maurice Joly | Bismarck | | | Jaques Chirac | Nicolas Sarkozy | Donald Trump | Serge Gainsbourg |
| | Rousseau | | | | | | | Carla Bruni | Mick Jagger |
| 1848 | | | | French Constitution | French Republic | 2006 Paris riots | Paris | George Monbiot: Revolution and Utopia | |
| Holland | | Louis Bonaparte | Napoleon III | | | | | Robespierre | |
| Mahatma Ghandi | | | | | | French Revolution | | Denton | |
| Elliot Johnson: Lessons in Leadership | | George Washington | | 100 Napoleon Bonaparte | | | | | |
| Winston Churchill | | Charles de Gaulle | | | | | | Duke of Wellington | |
| F.D. Roosevelt | | | | | | Waterloo | | | |
| Moscow | | Siberia | Russia | | | | | St. Helena | |
| | | | | Napoleons Corsica | | The Great Dictator | Adolf Hitler | World War II | |
| Putin | Lenin | Russian Revolution | Tsar Nicolas I | | Beppe Grillo: Small men and power | Charlie Chaplin | | Napoli (Naples) | Napoleon Hip Hop (Rapper) in Paris |
| Che Guevara | Stalin | | | | | | | | Gangsta Rap | 2Pac Shakur |

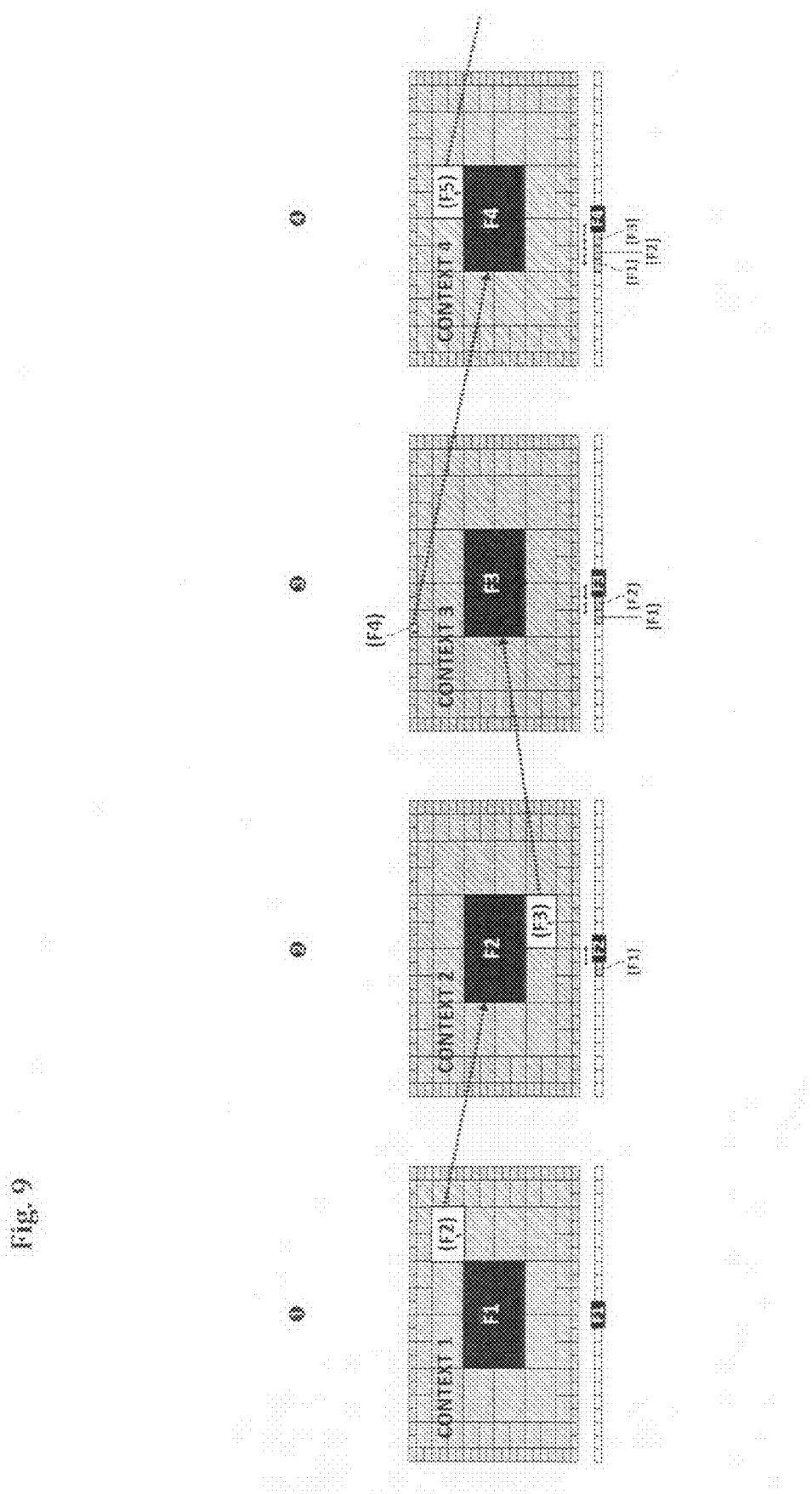

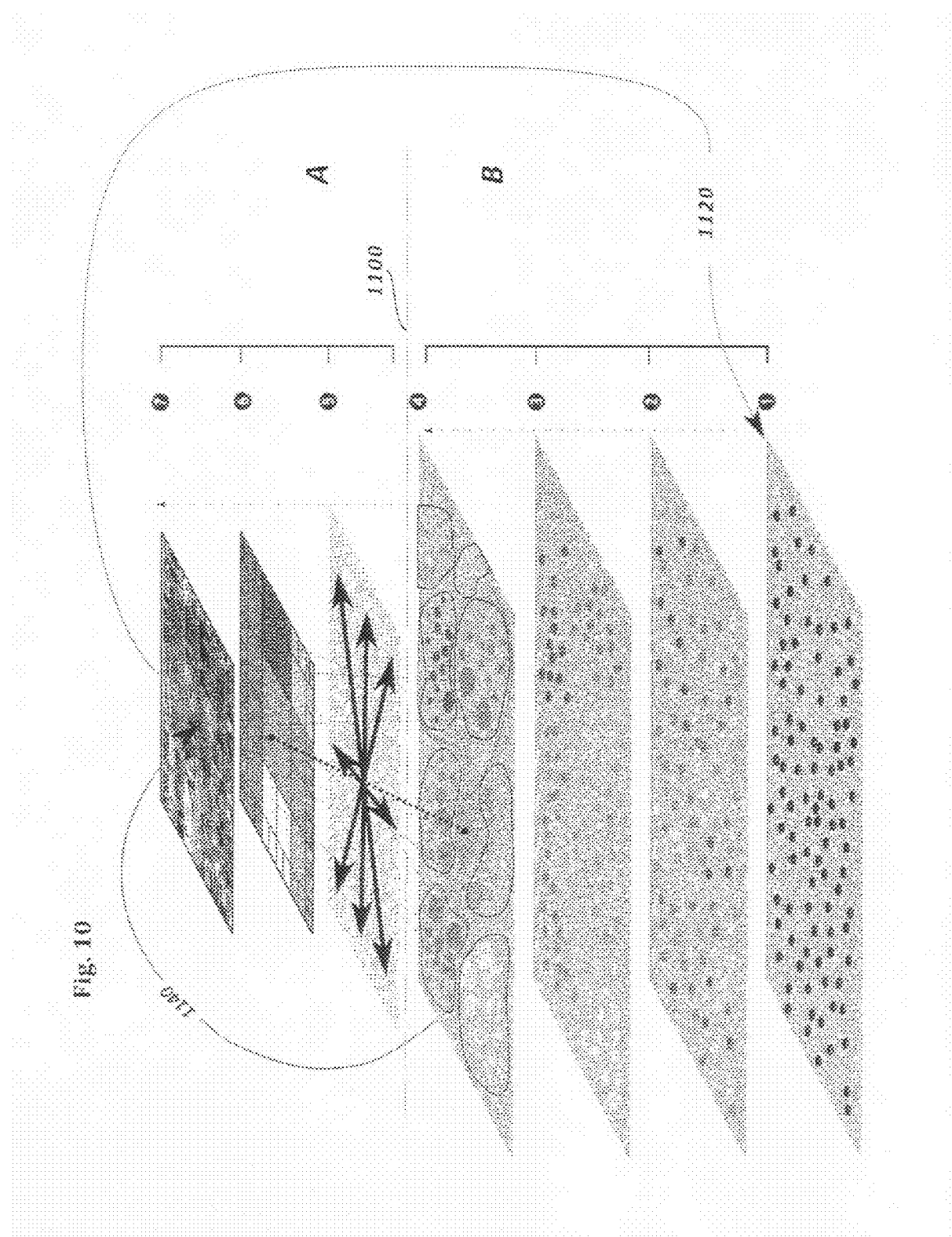

VISUALIZATION-BASED USER INTERFACE SYSTEM FOR EXPLORATORY SEARCH AND MEDIA DISCOVERY

CROSS REFERENCE TO RELATED APPLICATIONS

This application is the National Stage of PCT/DE2009/001440 filed on Oct. 16, 2009, which claims priority under 35 U.S.C. §119 of German Application No. 10 2008 051 880.8 filed on Oct. 16, 2008 and under 35 U.S.C. 119(e) of U.S. Provisional Patent Application Ser. No. 61/215,730 filed on May 8, 2009, the disclosures of which are incorporated by reference. The international application under PCT article 21(2) was not published in English.

The invention relates to a navigation device for organizing entities in a data space, this navigation device having a distribution unit and a display unit and the display unit showing a rigid, geometrical grid, the rigid geometrical grid having a central field and a first field circle with associated first circle fields which can in turn have further sub field circles with related field circles.

The SMB (Semantic Media Browser) simplifies and improves navigation in great quantities of media contents, the media contents being disposed on the monitor in a structured manner according to their properties and this order adapting dynamically to the entity respectively brought into focus, during navigation from one entity to the next. The principle can be described as "focus plus context plus flow" or correspondingly designated as "semantic magnifier".

In every situation there is a central visually highlighted "focus".

Entities which are associated to the central focus are structured around it and are disposed depending on their relevancy and displayed in a reduced manner. This corresponds to the "context".

An entity can be selected from the context in order to form the next focus. A new context of entities which is associated logically with the current context is assembled around this new focus. If an entity is again selected as a next focus from the current context, a context matching it is formed in turn, etc. This corresponds to the flow.

During use a linear sequence of media contents (flow), which was selected from the dynamically calculated and non-linear displayed context, is generated.

The innovation of the display thereby lies with the algorithmically generated geometry in which, after a dimension reduction and after being filtered out to symmetrically disposed prioritized parameters (for instance a number between 4 and 8), the contents of n-dimensional (Meta-) data spaces are distributed so that they are viewable at a glance and directly selectable.

The currently focused content is located in the geometrical centre. The associated context, consisting theoretically of any number of other entities, is disposed around it.

The simple grid makes it possible to display two essential aspects simultaneously and in an intuitively understandable manner merely through the geometrical disposition of the entities: a relevancy of associated entities to the current focus and a resemblance structure inside the context.

What matters particularly, is the normalization, which amounts to interface standardization, and matching of the visual symmetry of the grid to the multidimensional symmetry mapped in it (represented according to clustering algorithms or a semantic map), which reduces the cognitive complexity of past approaches and provides an interface which is particularly easy to use.

The navigation device is equally adapted for displaying weakly consistent or inconsistent metadata as well as strongly structured metadata with clear ontologies. Different methods are thereby used. This solves different types of problems.

Predetermined ontologies can be displayed multidimensionally in a structured and consistent manner in contained relationships and made available for experience via several navigation steps.

As a whole, the SMB makes a visual ordination and navigation method possible, which is new in this combination, for media data and their audiovisual representatives in a (potentially endless) symmetrized dimension-reduced topological geometry.

There are many different user interface entries in editorially processed media pools with strongly structured meta data ("Controlled Vocabulary") based on an ontology, which are adapted for finding referenced media files contained in them and to visually display the semantic relationships between different media files.

There is currently a lack of uniform approaches to make these search options and visualizations of relationships intuitively accessible to a layman (in the sense of the underlying ontology) in a consistent graphical user interface.

In their default setting, established search engines such as google.com or bing.com display unidimensionally arranged representations of the search result in lists or columns.

Search engines such as google.com or bing.com have thus a clear separation between the search interface and the content-related presentation of the search result which usually requires leaving the search engine being used for the referenced result inside its carrier platform.

Big user-generated media pools ("social media sharing networks") such as the interne platform "youtube.com" have weakly structured, inconsistent and uncontrolled metadata. This data is characterized in that it does not have a uniform ontology. An algorithmically generated consistent ontology or an editorial processing are unthinkable, since the terms are entered by the users themselves and thus partly strongly diverge, even though they represent the same thing and the amount of metadata is so big that the personnel necessary for organizing this metadata is not imaginable.

The same is also valid with communication platforms such as "Twitter.com". A user of this platform has a series of contacts, the posts of whom he can follow. These posts correspond in their use to the blogging principle, blogging on Twitter.com being limited to SMS length. That is why it is called micro-blogging.

If the number of contacts or the number of posts or blogs is very big, one can easily lose track of things. The same applies to chat platforms such as "ICQ.com".

During a standard search on the Internet, for instance Google, a series of hits is displayed in a preference list. A connection with similar terms or terms belonging to this topic does not occur. Further modifications of the search term must be manually entered by the user. This leads to increased entering of terms or clicking of Internet links.

The object underlying the invention is to improve the prior art.

This object is solved by a navigation device for organizing entities in a data space, the navigation device having a distribution unit and a display unit and the display unit displaying a rigid, geometrical grid, the rigid geometrical grid having a central field and a first field circle with associated first circle fields, the first field circle being disposed around the central field and more than two central field preference orders being allocated to the central field, an associated central field preference vector being related to each of these central field preference orders in the rigid, geometrical grid, the distribution unit determining one or two preference entities for each central field preference order in the data space and displaying this preference entity in the first circle field, into which the central field preference vector is pointing, or displaying both preference entities in adjacent first circle fields, the borders of which overlaps with the central field preference vector.

Data pools with weakly structured, inconsistent and uncontrolled metadata can thus advantageously be flexibly structured in themselves and specified more closely.

The navigation device is adapted for aggregation, filtering, and visual representation of so-called "trending topics", as they can be observed on twitter.com, more specifically of the metadata referenced therein.

The navigation device can furthermore represent functionalities of "social bookmarking" and/or "social news" (as on "digg.com", for instance) inside collaboratively used instances of the navigation device and thus, in case of a high use frequency, generate individual "trending topics" on platforms such as twitter.com, which in turn refer back to the navigation device and strengthen its use frequency.

The navigation device is equally adapted to structured visualization of local media data inside the individual operating system on the basis of usable metadata (tags, data information, physical parameters, etc.).

Data pools with strongly structured metadata can equally be consistently explored in the same visual disposition on the basis of a predetermined ontology inside a standardized filter arrangement ("semantic map", preconfigured or configurable).

The following notions must be explained first:

"Entities" comprise different types of data or metadata. Entities can comprise for instance "Youtube.com"—metadata such as titles, keywords, description texts, statistical data and/or a list of similar videos. In communication platforms such a "Twitter.com", the metadata can cover the avatar, the associated information text, media links referenced therein, the time of the message and the degree of popularity.

"Entities" can equally contain strongly structured and editorially processed metadata of thematically organized media pools with semantically unequivocally determinable relationships inside a predetermined ontology, as in a corporate semantic web environment or in editorially written commercial media archives.

"Organizing" does not necessarily occur inside a data type, and can rather include respectively one or few hits of one data type and/or one or few hits of another data type. Titles, keywords and description texts can thus be disposed next to each other. The internal order regarding each data type can also be saved. It is possible for instance to deposit the five most frequent titles under the data type "title".

The "data space" comprises the intranet of an organization, the Internet, an Internet platform, more specifically "Youtube.com" or more specifically "Twitter.com", network platforms, communication platforms and furthermore comprises all data pools with weakly structured, inconsistent, "uncontrolled" metadata.

In another use, the "data space" also comprises the intranet of an organization, the Internet, an Internet platform, network platforms, communication platforms, and additionally comprises all data pools with strongly structured and consistent metadata, based on uniform ontologies.

In this context, "uncontrolled" more specifically means that a uniform ontology or an editorial processing of the metadata is not available or is not realizable.

The dimensions of the "rigid, geometrical grid" can be modified. After determining its dimensions, they substantially remain constant. The rigid, geometrical grid can thereby have a saucer-type configuration. Ring-shaped saucers but also rectangular saucer models are both possible. Generally, the fields in the rigid, geometrical grid become smaller and smaller toward the outside.

The "rigid, geometrical grid" can display inside the predetermined dimensions (which take up, for instance, a maximum of thrice the width, respectively height of the central field) a hypothetically endless space inside the spatial limits of the computer monitor.

The "rigid, geometrical grid" can be generated algorithmically and iterated endlessly.

The "central field" can be the field which is disposed in the centre of the rigid, geometrical grid and generally is the biggest field.

The "first field circle" is formed by fields which are directly adjacent to the central field. The fields of the first field circle are thereby called first circle fields.

The term "preference order" defines a determined ranking order of entities for the entire text. The hit list of a search with the Internet platform "Google.de" can for instance display such a preference order. The hit list of an internal search engine of an Internet platform can also be consulted in a preference order. The relationships between separate terms and their ratings can also be used as a preference order. A similarity search or a parallel search related to the meta-tags of an Internet platform can thus additionally occur for the first hit of a "Google" search.

The "central field preference order" is the preference order of the central field.

The "preference vector" represents a direction in which a selection of the preference order can be displayed and generally has at least a rank of the preference order and/or basic information for determining a preference order. A preference vector can thus generally comprise a direction and information.

The "central field preference vector" is the preference vector of the central field, the central field having possibly several preference vectors or central field preference vectors.

The "preference entity" is a rank of the preference order and can be the top rank or a second, or a third, or a fourth, or a lower rank of the preference order. The preference entity can represent the information of the preference vector.

In an embodiment of the invention a free field reference entity for free first circle fields can be determined by means of the distribution unit, this determination occurring with the help of the preference vector product of the adjacent central field preference orders associated to the central field preference vectors.

Fields which do not have a central field preference vector pointing at them can thus advantageously be filled with information to be displayed.

The following notions must be explained first:

"Free circle fields" do not have a definite allocation by preference vectors. Thus, no preference vector or several preference vectors can point to this circle field.

"Free first circle fields" are the free circle fields of the first field circle.

The "free field preference entity" is the entity, which is shown in the free field.

The "preference vector product" is a product of two adjacent preference vectors and results in the simplest case from an AND connective of the top rankings of the preference order on which the preference vectors are based. The preference vector product can use each adequate correlation of the top rankings of the preference orders and can be allocated again to a preference order by introducing a hierarchy.

Thus, the first preference order can for instance have "physicist" as a top ranking. The preference order of the adjacent preference vector and thus of the adjacent preference order can have "general theory of relativity". These terms are connected in a "search engine" or by means of a correlation algorithm, which results in "Albert Einstein" as a preference vector which is displayed in the free field between the directions of the preference vectors. The title of a book about the general theory of relativity, for instance, can figure in second place in the associated determined preference order.

In order to show a deeper order of the entities, a second field circle with associated second circle fields can be disposed around the first field circle.

In a further embodiment of the invention, the number of second circle fields can be greater or equal to the number of first circle fields. Thus, a rating or a correlation rank of the entity can be advantageously reflected by means of the size of the fields, more specifically with a great number of second circle fields.

In order to fill the first circle fields with relevant entities, a first circle field preference order or several first circle field preference orders with respective first circle field preference vectors can be allocated to one first circle field or several first circle fields, the first circle field preference vector pointing toward the second field circle.

In another embodiment of the invention, the distribution unit can determine one or two first circle field preference entities for each first circle field preference order in the data space and display this first circle field preference entity in the second circle field toward which the first circle field preference vector is oriented or display the two first circle field preference entities in adjacent second circle fields, the adjacent borders of which overlap with the first circle field preference vector.

Thus, the second circle field can advantageously be described by the first circle field preference entities in the direction of the first circle field preference vector. Adjacent fields of the second circle field can furthermore be filled with first circle field preference entities.

In order to fill free second circle fields, preference entities for free second circle fields can be determined by means of the distribution unit, this determination takes place by the preference vector product of the preference vector of the adjacent preference order.

In another embodiment of the invention, the preference vectors can include the central preference vectors and/or the first field preference vectors. Thus, preference vectors of different field circles can advantageously be connected to each other as a preference vector product.

In another embodiment of the invention, further field circles with further fields can be disposed around the second field circle. Thus, it is possible to advantageously increase the displayed space of organized entities.

In order to optimally utilize the rigid geometrical grid, the further field circles can be displayed only partially in the rigid geometrical grid.

In another embodiment of the invention, the number of fields of a further field circle can be greater or equal to the number of a field circle located further inward relative to the further field circle. Thus, a deeper organization of the entities can be advantageously displayed.

In order to fill the fields of the further field circles with entities, one or several field preference orders with respective field preference vectors can be allocated to one or several fields, the field preference vector pointing in the opposite direction to the central field.

In another embodiment of the invention, the distribution unit can determine one or two field preference entities for each field preference order in the data space and display these field preference entities in the further fields toward which the field preference vector is pointing or display the two field preference entities in adjacent circle fields, which overlap with the field preference vector. Thus, all the fields of the further circle can be advantageously filled with entities.

In order to also fill the free circle fields, the field preference entities for the free circle fields can be determined by the distribution unit, this determination occurring with the help of the preference vector product of the preference vectors of adjacent preference orders.

In another embodiment of the invention, the preference vectors can comprise the central preference vectors and/or the first field preference vectors and/or the field preference vectors. Thus, a first circle field vector can have an influence, beyond the second circle, on the preference order of the fields of the further circles.

In another aspect of the invention, the object is solved by a computer with a processing unit and a monitor, the navigation device, as described above, being implemented in the computer, the monitor taking over the function of the display unit and the processing unit the function of the distribution unit and the computer having access to entities in a data space.

Thus, electronic data, as available for instance on the Internet, can more specifically be used for this invention.

N-dimensional vector spaces can be reduced or filtered in the data space of the invention to 4-8 selected dimensions, which can in turn be simplified and consistently simultaneously made visible inside a standardized, symmetrical, 2-dimensional representation plane (Euclidian plane). The dimensions are extracted from metadata (or via content analysis) of the underlying media contents, the symmetrically disposed and comprehensible structure of the selected dimensions is preset, automatically determined or configurable by user input.

Semantically related contexts, which by means of the navigation device, through a simple optional choice, consistently generate other context creations in the same grid in a consistently flowing navigation, these context creations aiding an intrinsic autotelic motivation for further interaction without having to leave the navigation device, are shown around a central focus. This can be described as focus plus context plus flow.

The particularity of the invention furthermore lies, beyond a specific visually standardized focus plus context variant, in the consistency and coherence of a consistently flowing navigation (flow) between automatically formed context situations and the search process leading thereto, which do not require further search input and previous knowledge—each choice triggers and visualizes a new determined context search, which in turn prompts another context search through an optional choice, etc. (see FIG. 9)

The parameters of the multidimensional search matrix do not have to be known nor explicitly selectable, though this can of course be possible in an "expert modus".

In another embodiment of this computer, the computer can have input means. Interactions between a user and the computer can thus occur advantageously.

In order to select a field of the rigid geometrical grid or its entity, a first circle field or a second circle field or a circle field can be selected by means of the input means.

In another aspect of the invention, the object can be solved by a method for modifying a central field in a navigation device as described above, a first circle field or a second circle field or a circle field being selected and shown as a central field. Thus, it is advantageously possible to navigate or surf in the data space via the preference entities.

In order to define missing preference entities and their preference orders of new fields, preference entities of the new first circle fields and/or the new second circle fields and/or the new circle fields can at least partially be determined by the distribution unit.

In another embodiment of the method, the preference entities can be shown in the new first circle fields, the new second circle fields and the new circle fields. Thus, new information can be advantageously displayed to a user.

In order to implement the method described here for the Internet, the implementation of the method can occur on a computer as described above.

In another aspect of the invention, the method can be solved by a communication displaying method, the most recent communication information being displayed in the navigation device as described above, in the first field circle and older communication information being displayed offset in outwardly lying fields. Thus, several communication threads can be advantageously followed from the central field.

The following notions must be explained:

"Communication information" can comprise more specifically the contents of a message, the associated person and an image of this associated person and the age of the message. The youngest communication information can thereby have the highest ranking in the preference order.

In another aspect of the invention, the object can be solved by a communication surveillance display method, the most recent communication information of an interesting entity being displayed in the navigation device as described above in the first field circle and older communication information of this interesting entity being displayed offset in outwardly lying fields. Thus, the communication information of a person can more specifically be displayed, the interesting entity being in this case the interesting person.

In another aspect of the invention, the object can be solved by an algorithmic method for generating a rigid geometrical grid, the rigid geometrical grid being based on a potentially endlessly iterable geometry.

Thus, the geometrical grid can be displayed as endlessly extensible.

In another aspect of the invention, the object can be solved by an algorithmic method for a disposition of visual representations of media contents that is automated, coherent and structured in its relationships, the structured disposition occurring in a potentially endlessly iterable geometry.

Thus, the complete data space can become accessible.

In another aspect of the invention, the object can be solved by a navigation device which unites the methods described above in a consistent and symmetrized user interface, so that the complexity of relationships to be displayed in an information retrieval is reduced.

In one implementation, it is possible to connect the methods for coherently browsing, with regard to contents, the visual representations of media contents which are algorithmically determined in their relationships and also algorithmically displayed in a structured manner.

In another implementation, a classical focus plus context principle can be extended to the requirements of audiovisual media.

In another implementation, a flowing, rummaging browsing can be made possible, so that the navigation device is reusable after a search process. Thus, a flowing, rummaging browsing can be made possible without having to leave this navigation device after each search process. Navigating and receiving the found and randomly selected contents can form a sequentially, functionally and visually consistent unity ("focus plus context plus flow").

In another implementation the necessity of explicitly formulated search inputs and the previous knowledge necessary for this search can be significantly reduced by visual selection methods and it is made possible to include individually relevant contexts not known so far as a basis for further search intentions. Thus, a rummaging and simultaneously coherent browsing (controlled "serendipity-effect") can be made possible.

In another implementation, an interface for exploitation and/or visualization of arbitrarily determined metadata and/or physical information of media contents, more specifically physical information of media contents generated by an image analysis and a pattern recognition method, can be displayed.

The determined metadata and/or physical information of media contents can furthermore include, after a dimension reduction, an arbitrarily n-dimensional vector space, an arbitrarily n-dimensional information space and/or an arbitrarily n-dimensional data space and be prepared for reproduction or distribution, more specifically for mapping.

The n-dimensional vector spaces, the n-dimensional information spaces and/or the n-dimensional data spaces can furthermore be distributed and filtered, after preparation, to a number of symmetrically disposable and structured selected parameters in a two-dimensional display, so that a specific cognitive map of mentally simplified representations of multi-dimensional complexity is generated, which corresponds more specifically to a semantic magnifier.

The parameters can furthermore be pre-adjustable or flexibly automatically determinable or configurable via manual user input.

In another implementation the filtered dimensions can be displayed in their symmetrical disposition and according to the direction principle in a simultaneously visible manner as specific cognitive maps, so that a summary of many small queries and their derivations can be displayed in a single view.

The reduction and/or filtering of n-dimensional vector spaces can be incorporated after their reduction and preparation into a two-dimensional symmetrical geometry for visual understanding.

In another embodiment, the focus plus context plus flow process in audiovisual media pools can be provided as a fully or partially automated process, so that semantically coherent linearities and/or sequences can be generated for preferably passive reception with optional interaction. This leads to a classical television viewing environment.

The partly and intuitively comprehensible correlations can also be made visible and available for experience by the navigation device, which can also correspond to an ordination device, which acts as a "semantic magnifier" by means of its visual focus as well as the weighted content relevance distribution contained therein. A more precise definition would be a parameterized, symmetrized semantic "complexity reduction magnifier" (or lens) for browsing extensive media pools.

The navigation device can additionally be used for recursive navigation of the path followed by means of the navigation device.

Figure 2A:
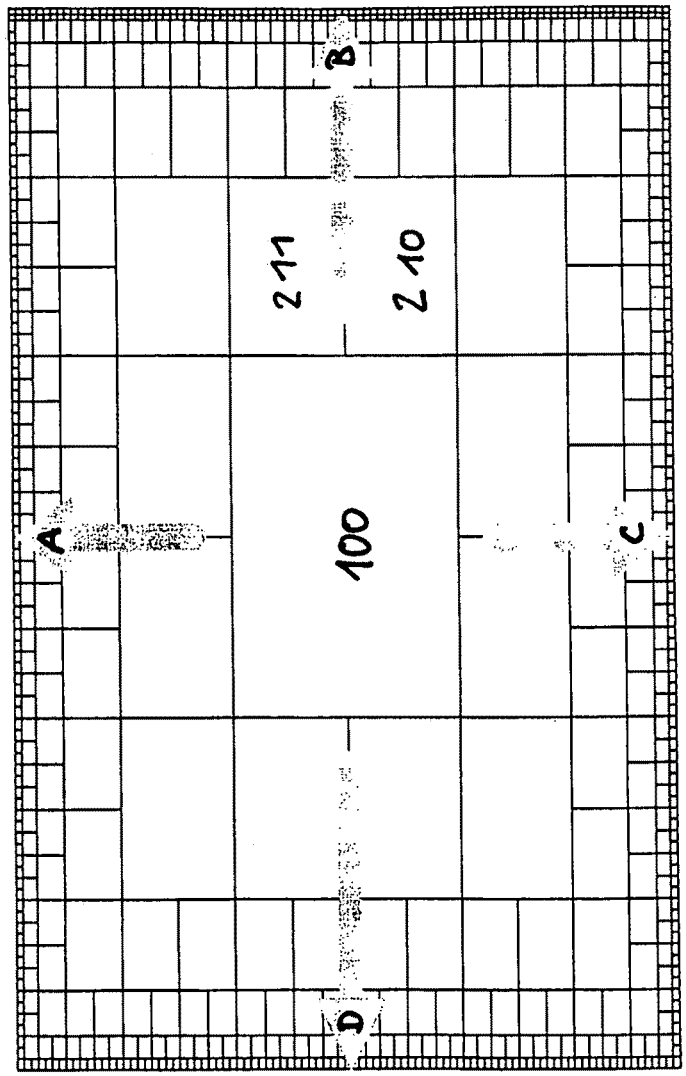
Figure 2B:
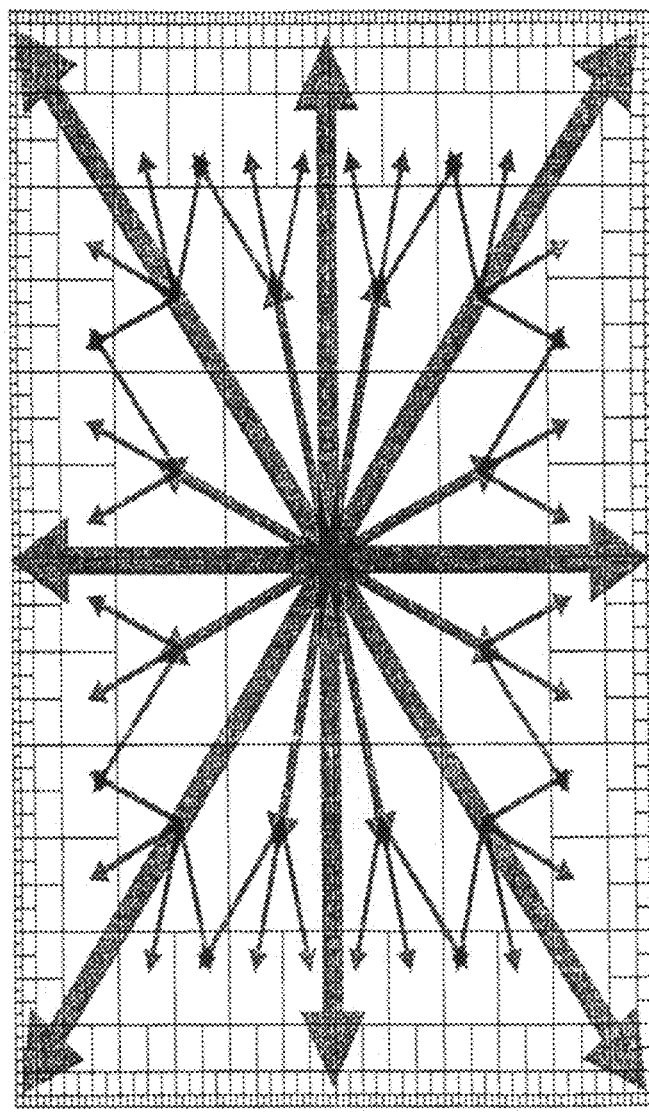
Figure 2C:
Figure 3:
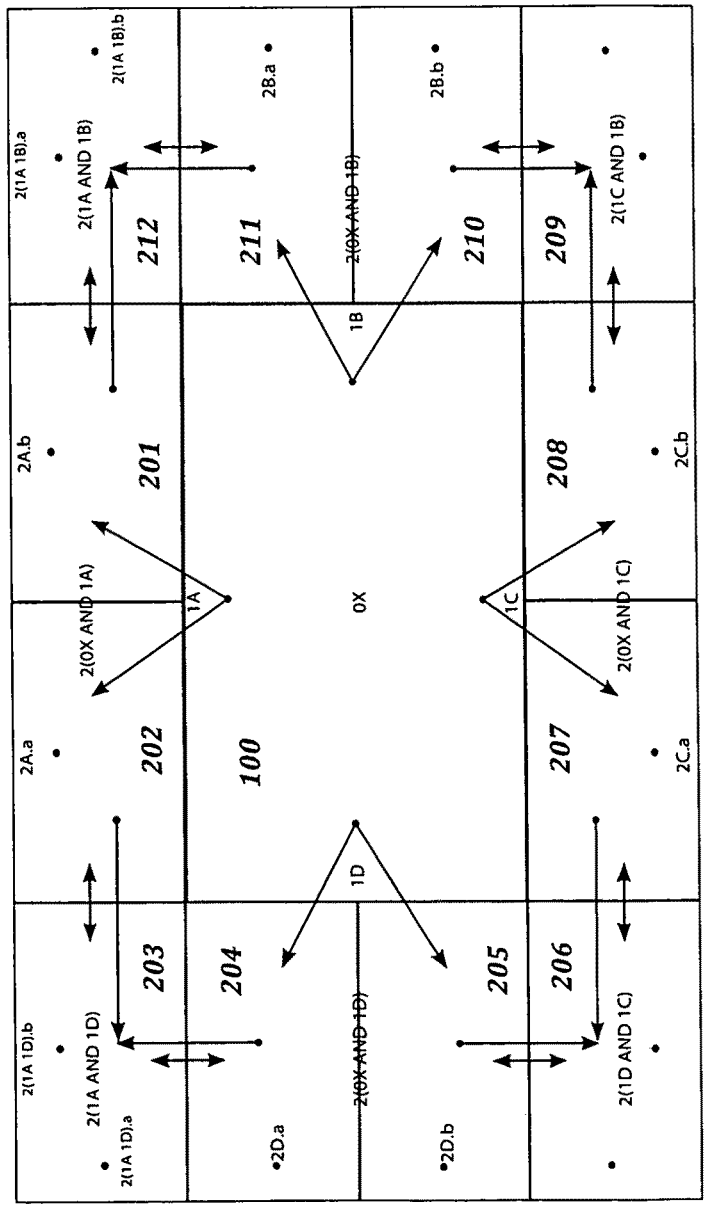
Figure 4:
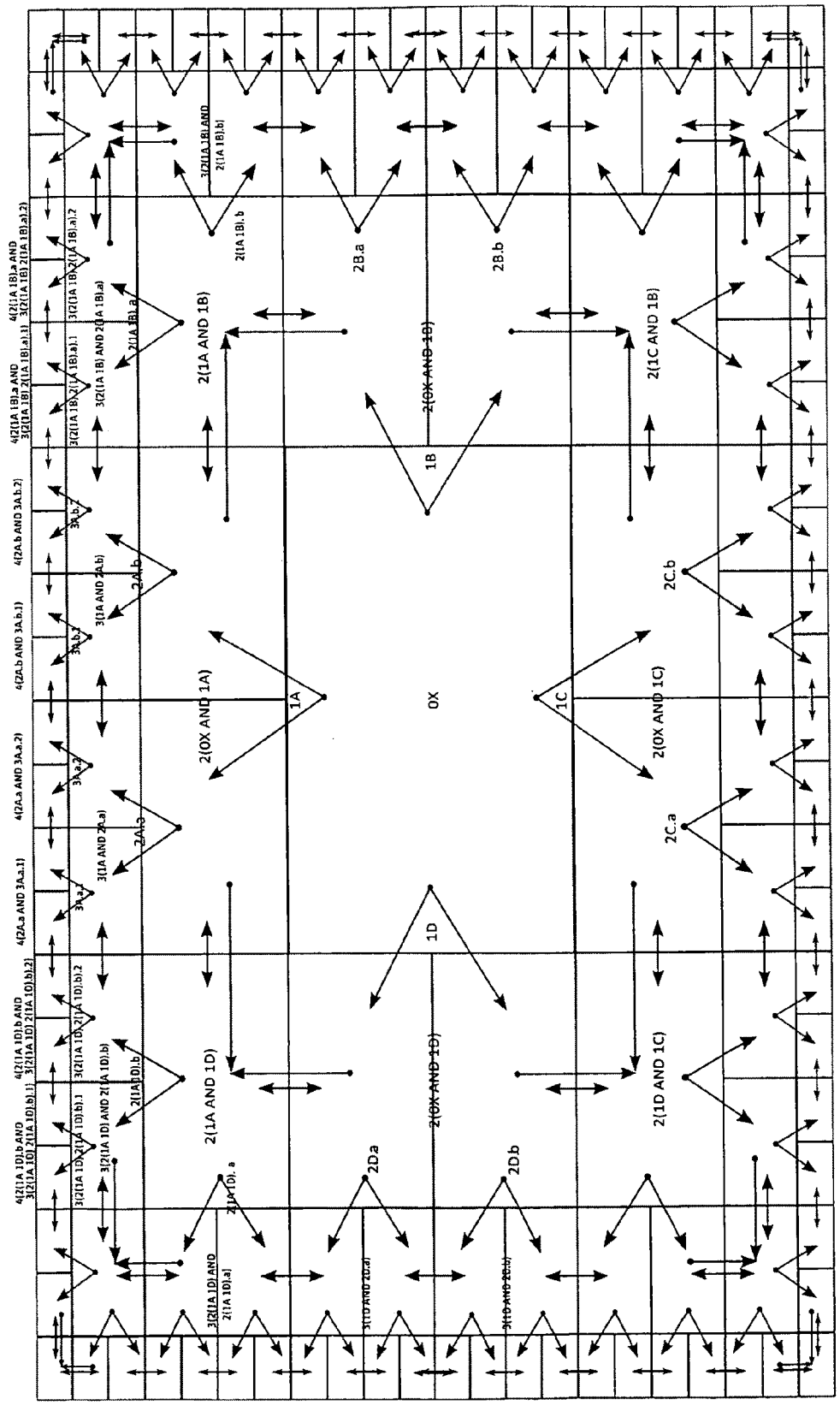
Figure 5B:
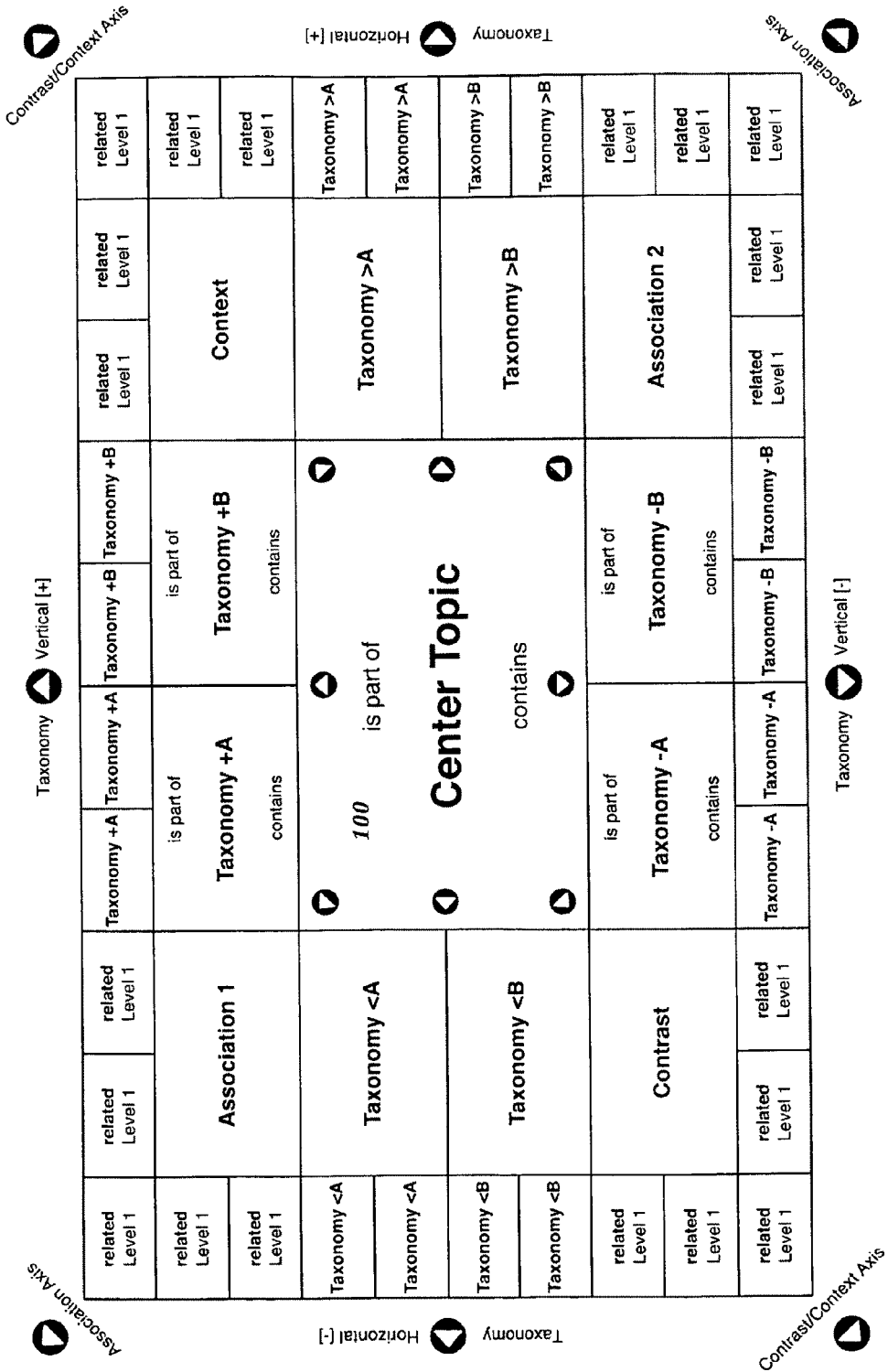
Figure 8A:
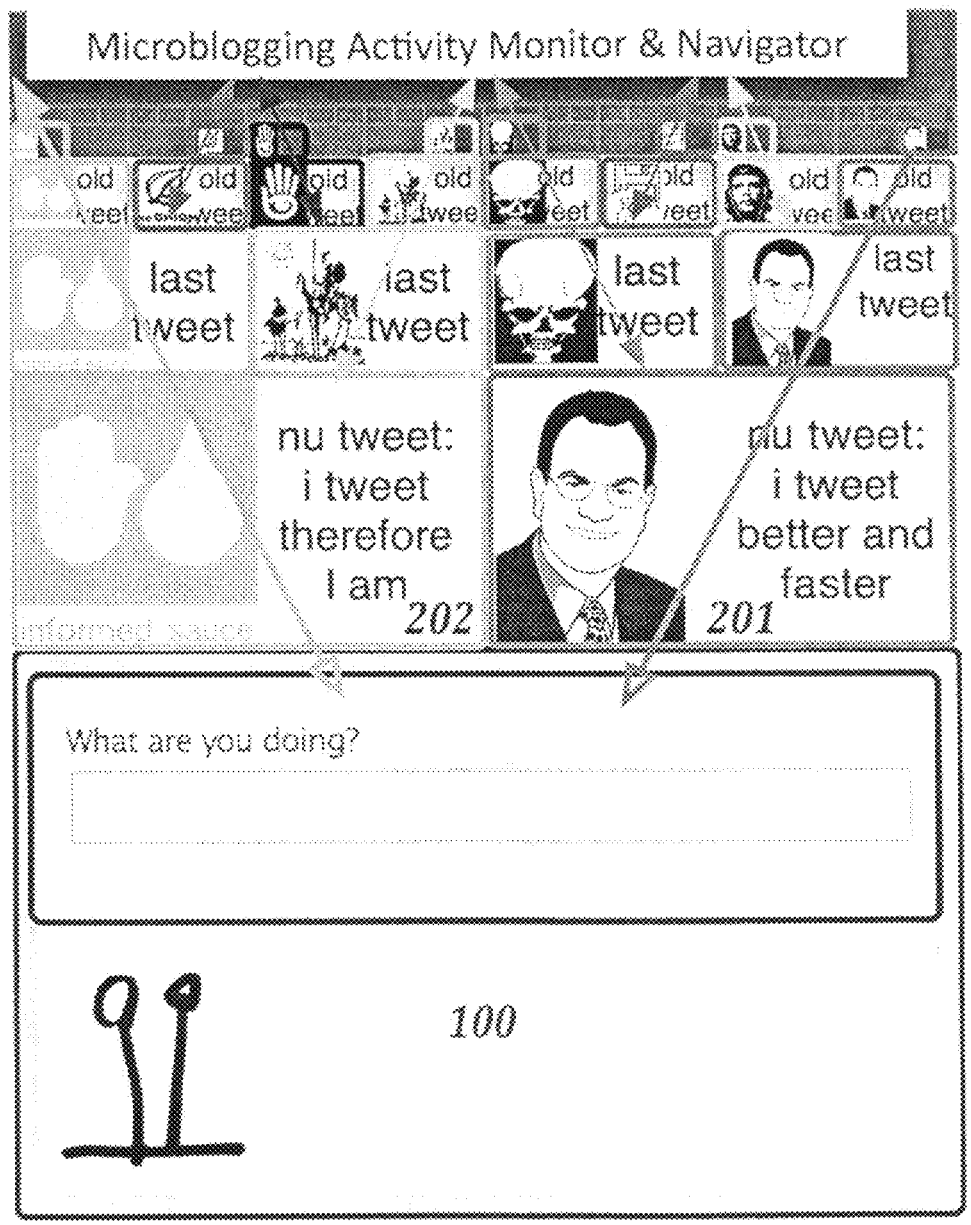
Figure 8B:
Figure 8C:
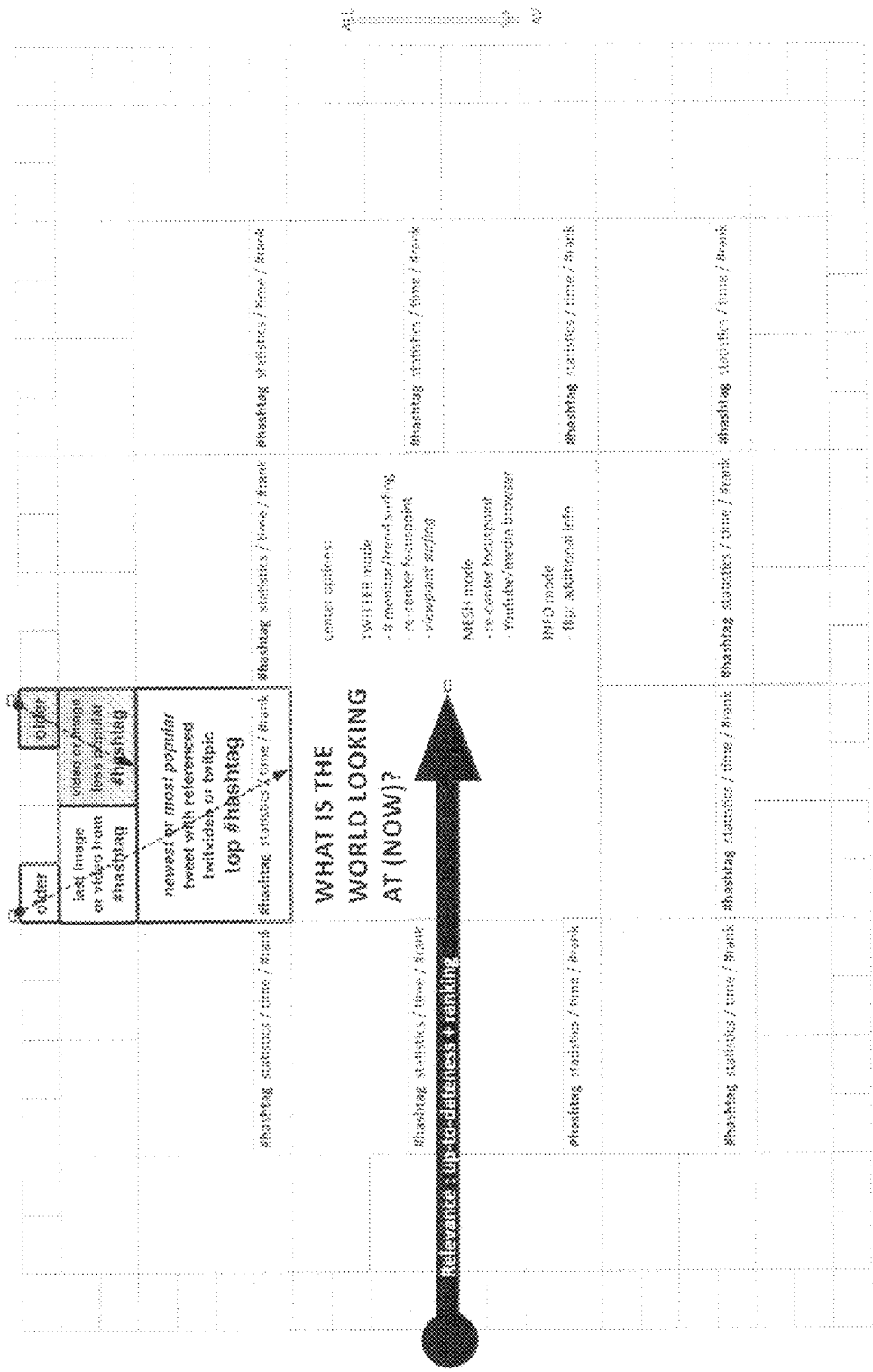

The invention is further explained in the following by means of exemplary embodiments. In the drawings:

FIG. 1a a representation of the rigid, geometrical grid,

FIG. 1b the corner section of a rigid, geometrical grid,

FIG. 2a the rigid, geometrical grid with associated central field preference vectors, FIG. 2b a rigid, geometrical grid with branching preference vectors, FIG. 2c a rigid, geometrical grid with associated circle fields and a relevance distribution, FIG. 2d a rigid, geometrical grid with associated circle fields, the relevance distribution from FIG. 2c and central field preference vectors from FIG. 2a, FIG. 2e a rigid, geometrical grid with associated circle fields, the relevance distribution from FIG. 2c, branching preference vectors from FIG. 2b and central field preference vectors from FIG. 2a, FIG. 3 a rigid, geometrical grid with first circle free fields and associated preference vectors, FIG. 4 a rigid, geometrical grid with associated description directives, FIG. 5a a rigid, geometrical grid with associated description allocations of the fields, FIG. 5b the rigid, geometrical grid from FIG. 5a with another field distribution, FIG. 5c a rigid, geometrical grid with explicit examples, FIG. 6 a rigid, geometrical grid after selection of a circle field from FIG. 5c, FIG. 7 a rigid, geometrical grid after selection of a circle field from FIG. 6, FIG. 8a the communication process in a section of a rigid, geometrical grid, FIG. 8b a communication process in the section of a rigid, geometrical grid with a typed text field, FIG. 8c the communication process in a section of a rigid, geometrical grid with deposited media file information, FIG. 9 a process of several navigation steps in the grid (as flow) and FIG. 10 a layer model with associated dimension reduction and mapping.

FIG. 1a shows a rigid, geometrical grid. The display of the grid occurs by means of a monitor. The central field 100 is displayed in the middle. The first circle field is displayed around this central field 100. All first circle fields, which are referenced between 201 and 212, form the first circle field.

The second circle field begins with the second circle field 301 and runs counterclockwise into the corner toward the second circle field 306, form there on toward the second circle field 315, then toward the second circle field 324 and from there toward the second circle field 333, the second circle being closed by reaching the second circle field 301.

FIG. 1b shows a section of the upper right corner of the rigid geometrical grid. It can thereby be seen that any number of field circles can be displayed by respective zooming.

The central field preference vectors A, B, C, D associated to the central field 100 in the rigid, geometrical grid are shown in FIG. 2a. The central field preference vector B runs between the first circle fields 210 and 211. Thus, the central field preference vector is not allocated to one precise field. Thus, the first two preference entities associated to the central field preference vector are distributed to the first circle fields 211 and 210.

The preference vectors of different fields are shown as arrows in FIG. 2b. In the cases in which two preference vectors point toward one field, this field is filled with a preference entity which results from a logical AND connective of the preference entities associated to the preference vectors. In this case, it also is a free field circle, even if two preference vectors point toward this field.

In FIG. 2c, a relevance is allocated to the central field and the circle fields. The smaller the numerical value of the relevance, the higher the relevance.

In FIG. 2d, the information from FIGS. 2a and 2c are displayed together. The information from FIG. 2b is additionally included in FIG. 2e.

FIG. 3 shows the allocation of a relevance to the central field and the circle fields. The value of the central field 100 amounts to 0X. This is connected to the value 1A "AND". Both resulting hits are written in the fields 201 and 202 and displayed thus.

The same applies to fields 210 and 211. The preference entity to be represented in the free field 212 is determined by a logical AND operator of preference entities from 211 and 210. This corresponds to the described preference vector product. The method described here is analogously used for the further first circle fields. An extension in this regard is shown in FIG. 4. This model describes a possible automated cascaded "clustering" of user-generated metadata for visual structuring of the most important determinable correlations inside the navigation device.

A variant of the rigid, geometrical grid is shown in FIG. 5, which carries out further subdivisions of the corner fields in the outer circle field. The delimitation and preference determining criteria underlying the fields are shown in FIGS. 5a and 5b.

Figure 5A:
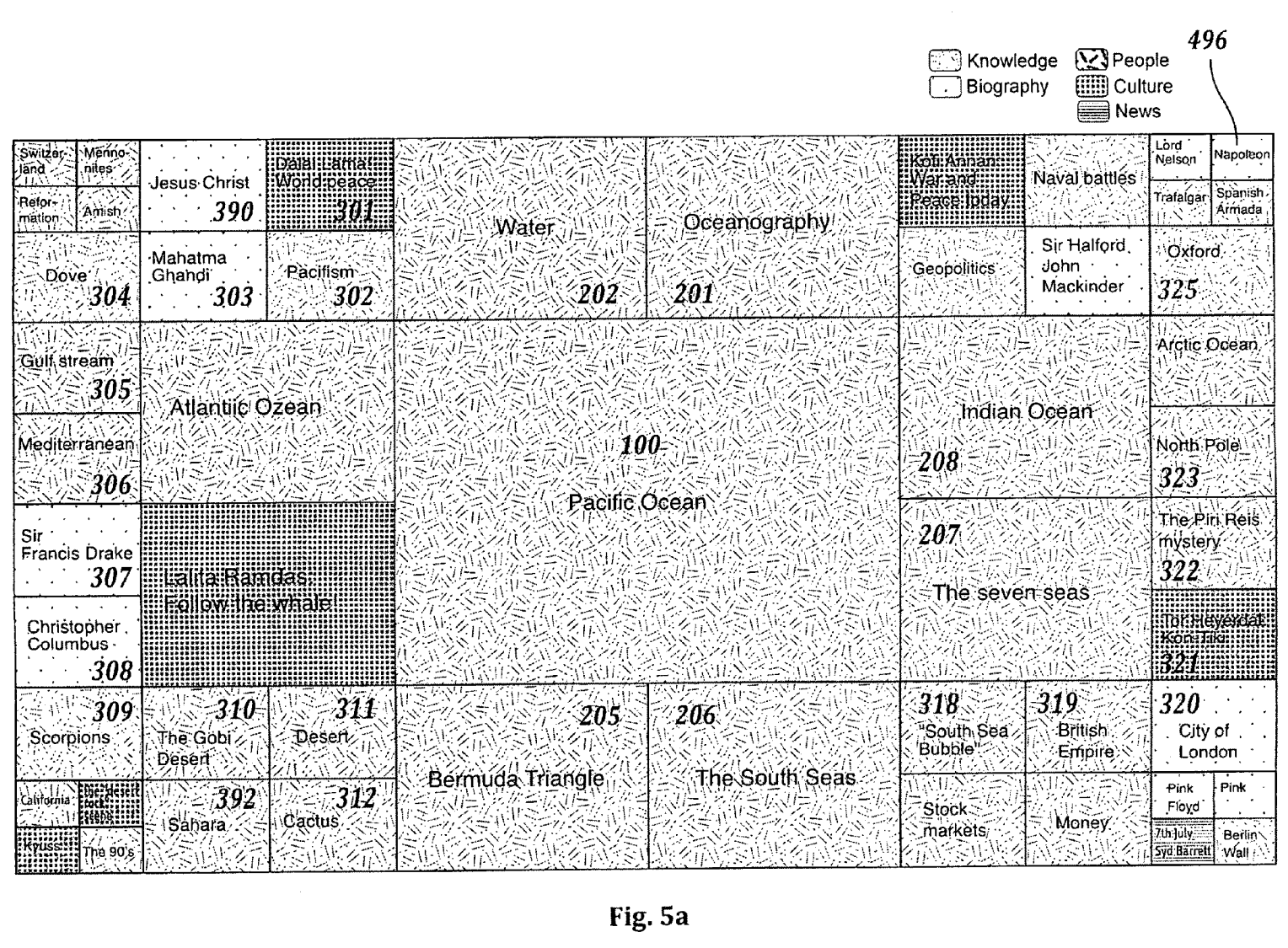

FIG. 5b describes the basis for the preference orders. The preference vectors are determined on that basis, whereby the displayed terms of the circle fields corresponding to the term of the central field 100 are determined. Such an allocation is explicitly shown in FIG. 5c.

In FIG. 5c, the central field 100 contains the term "the pacific ocean". The associated most similar terms are displayed in the first circle field 201, 202, 203, 204, 205, 206, 207, 208. The second circle 301 to 308 is displayed around the first circle. The information displayed in the first circle and in the second circle and in the further circles has been filled according to the method described in FIGS. 3 and 4.

If a user is interested in the field 496 in the term "Napoleon", he can select this field by means of the cursor, this field 496 becoming the new central field 100 from FIG. 6. The distribution unit in turn determines relevant entities around this term. If the user now selects the field 491, this field 491 becomes the central field 100 from FIG. 7. One thus can go from the term "the pacific ocean" to the term "Carla Bruni". This provides a possibility to navigate through heterogeneous data.

FIG. 8a shows a section of the rigid, geometrical grid. The communication input by the user is displayed in the central field 100. His last interlocutor is displayed in field 202. His twelve from last interlocutor is displayed in field 201.

If a communication is started with a person which is not displayed in the first circle, this latest communication thread pushes the twelve from last one away from the field 201 to the field 301.

Information belonging to a communication thread are displayed along the preference vector 801 (cf. FIG. 8b). In FIG. 8c, the metadata underlying the fields are deposited as "#hashtag" (user-defined metadata convention on twitter.com), by means of which a selection is distributed to the fields according to connection rules.

The navigation device is suited for associative navigation and visual display of extensive image databases with strongly structured metadata (corbis, getty images, etc.) as well as user-generated weakly structured metadata (flickr.com etc.)

The navigation device is suited for aggregation, filtering and visual display of audiovisual media contents with strongly structured metadata throughout several reference platforms—for instance a movie browser with a connection to data from imdb.com The navigation device is suited for aggregation, filtering and visual display of music contents (for instance on "myspace.com" with countless active "myspace music" members) with specific integration of user-generated networking information.

The navigation device is suited for visual administration and navigation through quantitatively big collections of heterogeneous media contents of local computer systems (for instance a display of a private digital photo archive) with integration of self or automatically determined metadata.

The navigation device is suited for connecting media contents of any type, visually displayed as described above, to digital sale systems (such as amazon.com) with directly related commercial offers for purchase transactions executed directly of via affiliate programs.

According to the same principle, the navigation device is suited for improving the browsing search in patent databases (such as the Google patent search). It makes it possible to visualize, filter and visually display references inside of patent applications (retrievable for instance via the Google patent search API) multi-dimensionally and simultaneously throughout several hierarchical levels and several sections.

The targeted connection of the aforementioned points creates a new, particularly intuitive and intrinsically motivating user interface for information retrieval, a however great complexity underlying the data space being thereby made available for almost playful experience in a functional and visually consistent simplified form.

Other instantiations such as algorithmic methods are possible. Algorithmic methods for automatical disposition of coherent visual representations of media contents in a consistent complexity reducing user interface can be realized.

Methods for transferring dimensions extracted after reduction and filtering from metadata (or content analysis) of multi-dimensional vector spaces (preset, automatically determined or configurable by user input) onto a symmetrically disposed and comprehensible, weighted focus-plus-context geometry inside a two-dimensional Euclidian plane in simultaneous display are equally possible.

The targeted connection of the aforementioned points creates a new, particularly intuitive and intrinsically motivating user interface for information retrieval, a however great complexity underlying the data space being thereby made available for almost playful experience in a functional and visually consistent simplified form.

The ordination and navigation device is not necessarily its own search engine and does not have to execute the methods of dimension reduction, but can be a device which processes the data obtained from different methods and automatically makes it visible and navigable in the described manner.

In another embodiment of the invention, the adequately sized progression list of previously visited contents itself, displayed linearly in the timeline, can be analyzed according to its metadata and transferred in turn, so to speak recursively, in the described manner, to the rigid, geometrical grid, so that the path which has been followed during many hours, days and weeks can be overseen in one glance in a novel multi-dimensional manner. The resulting "patterns" have a high significance regarding the interests of a user and can be archived and relayed in a separate format.

FIG. 9 shows the "focus plus context plus flow" concept. The bar displayed under the rigid, geometrical grid is an optional timeline. The central field is shown as Fn. A selected field is shown as (Fn) and a previous field as [Fn]. The value "n" is a current index. The navigation from 1 to 4 via 2 and 3 by means of the SMB can be gathered in FIG. 9.

FIG. 10 shows the layers which form the SMB. "1" thereby represents unsorted n-dimensional data (metadata for media files), "2" represents the determination and/or reduction of the dimensions by means of different data, "3" the sorting and grouping (clustering), "4" the weighting and the selection by means of different methods, "5" the Semantic Map symmetry distribution which is dynamically determined according to the cluster volume, "6" the Semantic Map which has been generated by a mapping method, and "7" the display plane, which is provided to the user.

The layers 5 to 7 form the "semantic magnifier", which are separated from input by third parties (layers one to four) by means of a dashed line 1100.

If a search query is 1120 is started on layer seven, the data from layer one is transformed into layer seven via the individual layers.

The navigation (flow) 1140 orients itself along the grouped data of layer 4 and allows the user to "flow" through the sea of data.

The invention claimed is:

1. A user interface system for exploratory search and media discovery programmed for organizing media items in a data space and making these media items navigable by users, the user interface system comprising
   a processing unit and a display unit,
   the display unit
      displaying a specific rigid 2-dimensional geometrical grid with a focal field in a center of the grid, the focal field being surrounded by at least one closed rectangular ring or by a plurality of closed rectangular rings getting repeatedly smaller towards the outside,
         where each ring is subdivided regularly into rectangular fields,
      resulting in the geometrical grid that subdivides any rectangular display in a regular, symmetric and centric manner as a recursive tiling,
      where this specific grid is used to visualize relations between the media items placed in the focal field and related media items distributed in the fields surrounding the focal field, following a focus-plus-context principle, where the media item in the focal field is the focus and the surrounding items are the context,
      from which users can select any item to become the new focus,
   the processing unit
      being programmed to filter and to map media items from n-dimensional data spaces to the specific grid,
      as a focus-plus-context visualization that serves as a user interface for enabling a semantically coherent navigation flow,
      where the user selects any media item of the user's interest from the context, and by that defines it as the new focus, which triggers queries to retrieve related media items, which are mapped again to the grid building an updated context, from where the user again selects a media item triggering new queries and consequently updated display of focus plus context,
   the processing unit being programmed to perform a dimension reduction of the n-dimensional data structure for mapping media items to the fields of the specific grid so that the proximity to the focus visualizes a degree of relevance of each context item to the item in the focus, and the arrangement along the grid's directions is an order by similarities.

2. The user interface system according to claim 1, wherein the number of rings of the specific grid is between 1 and n.

3. The user interface system according to claim 1, wherein the processing unit is
mapping media items to the grid according to the media items' relevance in relation to the media item in the center, representing the focus,
and ordering the media items along the directions of the grid, in a way that as a whole visualizes an order comprising relevance and direction in a single view, wherein direction and relevance can be based on semantic, temporal or other data.

4. The user interface system according to claim 3, wherein the specific grid further has any number of rings, on these rings media items are mapped by the processing unit as described in claim 3.

5. The user interface system according to claim 1, wherein the specific grid is fully covering any available rectangular area on the display unit with rectangular fields as a recursive tiling.

6. The user interface system according to claim 1, the processing unit having access to media items in the data space and the function of mapping the media items to the display unit.

7. The user interface system according to claim 1, further comprising an input device.

8. The user interface system according to claim 7, wherein each field in any ring is selectable via the input device.

9. A method for user interaction executed by a processing unit of a user interface system for exploratory browsing, where users are enabled to perform a fluent discovery process through a visualization-based user interface, comprising
a focus-plus-context visualization that serves as a user interface based on a specific two-dimensional grid displayed by a display unit with a focal field in the center, surrounded by at least one closed rectangular ring or by a plurality of closed rectangular rings getting repeatedly smaller towards the outside, where each ring is subdivided regularly into rectangular fields, resulting in a geometrical grid that subdivides any rectangular display in a regular, symmetric and centric manner as a recursive tiling, where the media item in the central field is the focus and the surrounding items are the context,
an algorithm that is mapping media items to the fields of the specific grid according to their relevance in relation to the media item in the center representing the focus and ordering the media items along the directions of the grid according to the set of parameters associated with each direction,
in a way that as a whole it visualizes an order comprising relevance and direction in a single view, wherein direction and relevance can be based on semantic, temporal or other data,
a program filtering media items and mapping them from n-dimensional data spaces to the specific grid,
a user interface feature enabling users to select any field from the context, and by that defining it as the new focus,
a program filtering media items from n-dimensional data spaces based on the media item in the center representing the focus and the center media items' associated metadata,
the method for user interaction which enables users to engage in a fluent navigation process comprising the following steps:
display of media items arranged on the specific grid as focus-plus-context visualization,
selection of any media item from the context of the focus-plus-context visualization by the user,
update of visualization displaying the selected item in the center representing the focus,
query formulation based on the media item in the center representing the focus and the center media item's associated metadata,
filtering media items from n-dimensional data spaces based on the media item in the center representing the focus and its associated metadata,
mapping media items from n-dimensional data spaces to the specific grid according to the relation of each item to the center item onto rings weighted by relevance and along directions by similarity, and
another selection of any media item from the new context of the focus-plus-context visualization by the user.

10. A proprietary method executed by a processing unit, the method comprising steps of:
generating via the processing unit a specific grid geometry on a display unit, where the specific grid geometry is a 2-dimensional, symmetrical, rigid, recursive tiling with a focal field in the center, surrounded by a plurality of closed rectangular rings getting repeatedly smaller toward the outside,
subdividing each ring regularly into rectangular fields displayed on the display unit, and
distributing, via the processing unit, media items on the specific grid geometry on the display unit around a center media item according to the media items' multi-dimensional interrelations in data space,
wherein the length of the sides of each rectangular field in each ring is half of the length of the sides of the adjacent rectangular field in the neighboring inner ring, and
wherein the specific grid geometry serves as a mapping architecture for visualizing on the display unit the output of the processing unit programmed for organizing the media items in the data space, for filtering these media items, and for mapping these media items from n-dimensional data space to the specific grid displayed on the display unit.

11. The method for user interaction according to claim 9, comprising a method for mapping visual representations of media items to the specific grid that is coherent and structured in the relationships the specific grid visualizes.

12. The method according to claim 10, the method generating the specific grid on which the displayed complexity of relationships among media items is reduced in a consistent, centric and symmetrized way.

13. The method according to claim 12, the method generating the specific grid on which proximity to the focus visualizes a degree of relevance of each item represented in the context to the item in the focus, and the arrangement along the grid's directions is an order by similarities, which can be based on semantic, temporal or other data.

14. The method for user interaction according to claim 9, a classical focus-plus-context principle being extended to focus-plus-context-plus-flow to meet the requirements of browsing audiovisual media fluently by leading from one focus-plus-context visualization result to another.

15. The method for user interaction according to claim 9, a flowing, exploratory browsing being made possible, by the user interacting with the user interface system leading from one focus-plus-context visualization result to another, creating semantically coherent linear sequences of media items from a visualization of non-linear and multidimensional interrelations of media items.

16. The method for user interaction according to claim 9 enabling the user to select a visual representation of any media item from the context of visually correlated media items, and by that submitting a search query, which is formulated automatically in the background.

17. The user interface system according to claim 1, an interface for exploration and/or visualization of the media items' multidimensional interrelations wherein all media items relate to the central media item representing the focus and to the central media items' metadata.

18. The user interface system according to claim 17, wherein the processing unit performs a dimension reduction of the n-dimensional data space for mapping media items to the specific grid on the display unit.

19. The user interface system according to claim 18, wherein the processing unit is programmed to filter media items from the n-dimensional data space and to map the media items along symmetrical directions defined by a set of parameters and onto rings of the grid, so that the specific grid forms a cognitive map visualizing representatives of n-dimensional complexity with a simplified order in a single view, wherein the order can be based on semantic, temporal or other data.

20. The user interface system according to claim 19, wherein the set of parameters is pre-adjustable or generated automatically based on the data context, or is configurable via user input.

21. The user interface system according to claim 19, wherein the processing unit distributes the media items filtered from the n-dimensional data spaces to the specific grid and the grid's directions and rings so that the resulting specific cognitive map displays the results of one or multiple queries and the queries' derivations in a single view.

22. The method for user interaction according to claim 9, where n-dimensional data spaces after preparation and reduction are mapped onto the two-dimensional geometric grid that is highly regular and symmetrical.

23. The method for user interaction according to claim 9, which has an autoplay option in the user interaction process in which the user is lead from one focus-plus-context visualization result to another, where each selection of a media item to become the next focus is performed automatically by the processing unit, so that semantically coherent sequences of media items are generated and displayed, and by this users are enabled to consume media passively, and taking interaction only as an option, not as a must, which is particularly suitable for browsing audiovisual media.

24. The method according to claim 10 generates the number n of fields in a ring k according to $n(k)=(3*2^k-3)*4$.

25. The user interface system according to claim 1, where the use of the specific grid as a focus-plus-context user interface integrates search, navigation and reception of media items in a single view.

26. The user interface system according to claim 9, where the mapping of media items to the visualization grid reduces the complexity of the underlying n-dimensional data space to meet the structure of the grid, which has a highly regular, centric, symmetric and stable geometry, on which content items are arranged onto rings weighted by relevance related to the focus and along semantic directions by similarities in a consistent way.

27. The method for user interaction according to claim 9, where the use of the specific grid as a focus-plus-context user interface integrates search, navigation and reception of media items in a single view.

28. The method according to claim 10, where the spatial structure in the grid visualization represents a semantically weighted order without the need of displaying descriptions of relations through additional elements like lines, arrows, labels, text or whitespace.

29. The method according to claim 10, where the specific grid geometry filled with representations of media items forms a cognitive map visualizing representations of n-dimensional complexity within a simplified visual order.

30. The method according to claim 10, where the space available for the display of media items on the display unit is fully and seamlessly covered by the specific grid, on which media items are arranged by relevance and similarity.

31. The method according to claim 10, where the use of the specific grid as a focus-plus-context user interface integrates search, navigation and reception of media items in a single view.

32. The method for user interaction according to claim 9, further comprising a step of updating the display of the optional timeline showing the linear sequence of all media items the user selected.

33. The method according to claim 12, where the use of the specific grid as a focus-plus-context user interface visualizes a degree of relevance and an order by similarities in a single view.

34. The method for user interaction according to claim 9, further comprising a program performing a dimension reduction of the n-dimensional data structure.

* * * * *